Dec. 20, 1960  I. NAXON  2,965,738
YIELDABLE BALL FEEDS FOR TRAVELING SIGN CONTROLS
Filed Oct. 2, 1959
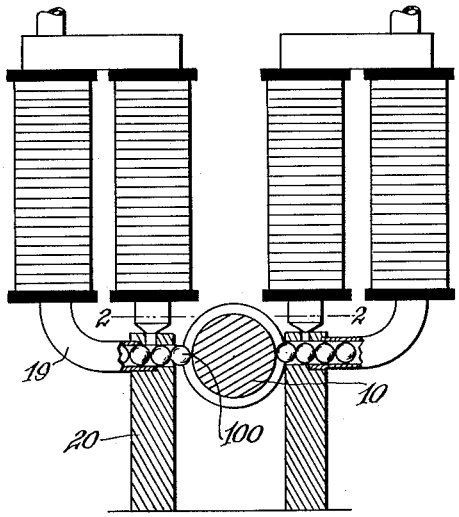
Fig. 1.
Fig. 2.
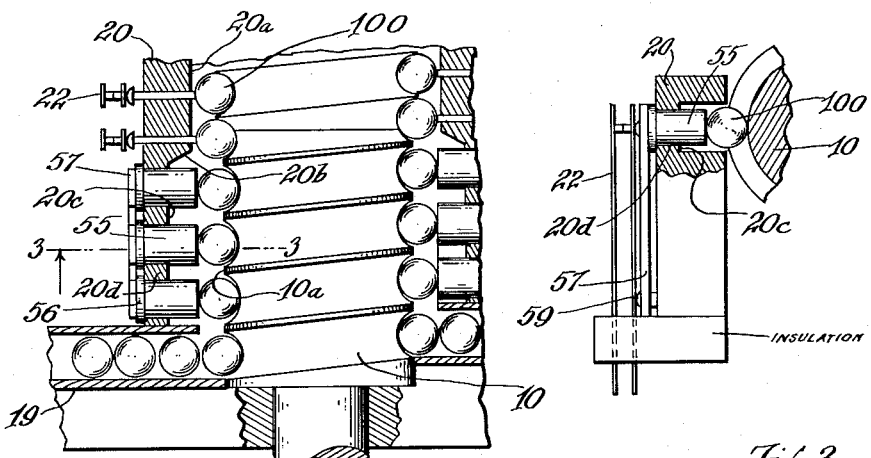
Fig. 3.
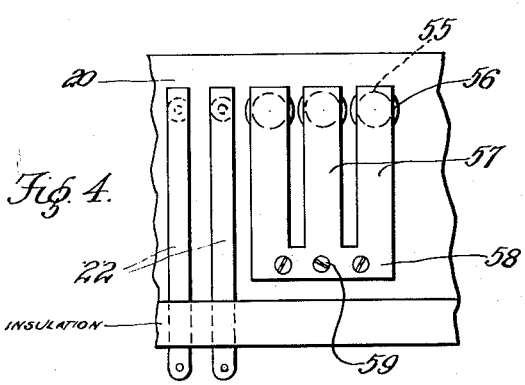
Fig. 4.
Irving Naxon
INVENTOR.
BY Stevens Batchelor
Attorneys.

United States Patent Office 2,965,738
Patented Dec. 20, 1960

2,965,738

YIELDABLE BALL FEEDS FOR TRAVELING SIGN CONTROLS

Irving Naxon, 3600 W. Touhy Ave., Chicago 45, Ill.

Filed Oct. 2, 1959, Ser. No. 843,978

16 Claims. (Cl. 200—158)

My invention relates to ball feed mechanisms of the type covered in my Patent No. 2,817,703, issued December 24, 1957, and more particularly to the introduction of the balls into the thread of the feed screw illustrated in the patent. When the feed apparatus is new or is receiving a limited amount of use, or is operated at a slow speed, it may be assumed that the feed operates continuously and with efficiency. However, when it is considered that the balls are of hardened steel, it is conceivable that their frictional travel in the conduits, augmented by the force of gravity which urges the balls in the direction of the feed screw, will induce wear in the walls of the conduits to the extent that balls leaving the same may be swerved slightly from the proper path, so that they will climb the walls of the screw thread and crowd against the bottom of the lateral guide channels, causing wear of the same and the winding screw thread walls. However, when the screw feed is depended upon to advance the balls with accuracy, and especially when faster speeds are involved, it is important that the course of the balls entering the screw thread be in true and meshing engagement with the thread, so that they may move freely and without error in the guide channels, and that the balls shall be released in timed relation with respect to the screw rotation. In order to insure this relation, it is one object of the present invention to provide means adjacent to the initial portion of the screw thread which will yield to such balls as enter somewhat out of the regular path, or out of accurate timing in relation to the screw rotation, so that such balls may not crowd one another or the guide channels and cause wear in the same and in the screw thread. It is equally important that errors in the ball-release signals, mechanical inaccuracies or foreign particles may create a situation where a ball is pushed into the screw thread out of time with the advancing spiral. As a result, a lagging ball could be sheared in half by the advancing spiral, or, if cleared by the latter, the ball could jam the apparatus or be pushed back into the conduit, causing an error in the signal.

A further object of the invention is to equip the channeled rails in which the balls travel while fed by the screw with yieldable elements which permit the progress of the balls without crowding the bottoms of the rail channels.

An additional object is to construct the yieldable means along lines of simplicity and in a manner promoting the continuous and smooth guidance of the balls.

A better understanding of the invention may be had by reference to the accompanying drawing, in which—

Fig. 1 is a view duplicating Fig. 4 in the aforesaid patent;

Fig. 2 is a section on the line 2—2 of Fig. 1 in the receiving zone of the feed screw;

Fig. 3 is a section on the line 3—3 of Fig. 2; and

Fig. 4 is a view from the left-hand side of Fig. 3.

Referring specifically to the drawing, 10 denotes the feed screw and 20 the rails alongside the same, these having the channels 20a in which the balls 100 advance on the rotation of the screw; and the balls control the operation of electrical contacts 22, as seen in Fig. 5 of the patent. In order to evaluate the importance of the present invention, it must be pointed out that the channels 20a should have a depth which, when added to that of the screw thread, totals the diameter of the steel balls, plus a relatively small amount of clearance to allow for dirt, foreign matter, mechanical tolerance or a coating of lubrication. For best results—except for the said clearance—the channel and thread should each have a depth equal to the ball radius. Should these depths be considerably greater, the frictional action of the thread-incline against the balls will push the latter outwardly, wedging them against the channel bottom and jamming the mechanism with a force or pressure approaching or even exceeding 100 pounds. To operate with safety the balls must therefore seat loosely in the channel bottom while traveling, except where the holes occur where the switch plunger-pins are accommodated, it being understood that these holes are sufficiently small to prevent the balls from pocketing or jamming therein. Necessarily, these plunger-pins receive only a few ounces of switch-blade pressure, which is sufficient to force the balls against the thread-bottoms, or minor diameter, under normal conditions.

The present invention applies in the region of the rails 20 between the ball-supply conduits 19 and the first contacts 22. Fig. 2 shows that the channels 20a are offset with inclines 20b leading to deeper channels 20c in the entrance portions of the rails 20. The rail portions 20d defining these channels receive slidably-disposed plungers 55, these being directed with a pressure of one or more pounds toward the thread of the feed screw which adjoins the ball-supporting conduits 19.

As seen in Fig. 2, each plunger 55 extends into the related channel 20c to a point short of meeting with a ball 100, that is, in alinement with the bottom 20d of the main channel 20a. The outer ends of the plungers are made with heads 56 normally bearing against the outer surfaces of the rails 20, as shown. The heads are maintained in this position by comparatively heavy leaf springs 57 formed from a plate 58 attached by screws 59 to the rails.

At this point it should be noted that the leaf springs 56 perform an entirely different function than the contact springs 22; the former merely serving to open and close contact points which at most requires but a few ounces of pressure. However, a very important feature of my invention resides in the fact that the springs 22 exert a pressure, when put into emergency action as will be explained, of at least eight times the strongest spring pressure required of the contact-spring.

Ordinarily the inner ends of the plungers 55 serve identically with the channel bottom 20a as an extended outer guide for the balls advancing in the channel 20a. However, should a ball be crowded out of the screw thread by entering off-course or out of synchronism, the crowded ball will not jam the next ball in line, but impinge on the first plunger 55. Being spring-backed, the plunger will yield and allow the ball the necessary leeway to settle properly in the thread of the screw. In case a ball lags slightly behind, the added tension could force the ball forwardly into the thread groove it may have missed. Should an extra or improperly-timed ball deviate to the extent of crawling over the major diameter of the screw adjacent its point of entry into the latter, I have provided a clearance for extending the crawling movement by making the feed screw of a smaller major diameter in the region of its first few threads, as indicated at 10a in Fig. 2. The deeper channels 20c of the rails may provide sufficient clearance for a stray ball to actually climb or be pushed over the major thread diameter of the screw until it finds traveling accommodation in the screw conveyor. As seen, a series of three—and possibly more—of the safety plungers 55 may be installed in order to allow the balls to become definitely alined with the screw thread before they reach the zone of controlling the contacts 22. Also, the incline 20b between the channels 20d and 20a serves as a lead into the latter channel in case a ball tends to lag in the channel 20d.

It will now be apparent that the above improvement constitutes a yieldable guide for balls entering the thread of the feed screw, in order that the crowding or packing of balls against the guide rails may be avoided when the balls enter the screw thread erroneously. Thus, the guide channel and the screw thread do not receive pressure from the balls and consequent wear. The improvement therefore maintains the entering zone of the feed screw in a condition promoting the smooth and accurate advance of the balls without any possibility of jamming the apparatus.

While I have described the invention along specific lines, various minor changes or refinements may be made therein without departing from its principle, and I reserve the right to employ all such changes and refinements as may come within the scope and spirit of the appended claims.

I claim:

1. A ball-feed comprising a screw receiving series of balls from the side, the thread of the screw seating the balls from one side, a guide for each ball series with a channel receiving the ball series from the other side, and means in one end of the channel yielding to lateral deviation of balls from said thread.

2. A ball-feed comprising a screw receiving series of balls from the side, the thread of the screw seating the balls from one side, a guide for each ball series with a channel receiving the ball series from the other side, and means in one end of the channel yielding to deviation of balls in the direction of the channel bottom.

3. The structure of claim 2, said means being disposed in said channel bottom.

4. The structure of claim 2, said means presenting a front normally even with the channel bottom, and the latter having a clearance in said end to permit the yielding of said means.

5. The structure of claim 2, said means presenting a front normally even with the channel bottom, and the latter deepening to a sunken portion in said end to permit the yielding of said means.

6. The structure of claim 2, said means presenting a front normally even with the channel bottom, and the latter deepening with an incline to a sunken portion in said end to permit the yielding of said means.

7. The structure of claim 2, said means comprising a plunger opposite each thread convolution, and a spring backing the plunger.

8. The structure of claim 2, said means comprising a series of plungers opposite consecutive thread convolutions, and a multiple spring backing-facility for the plungers.

9. The structure of claim 2, said means comprising a series of plungers opposite consecutive thread convolutions and slidable in said guide, and springs carried by the latter and backing the plungers.

10. The structure of claim 2, said means comprising a series of plungers opposite consecutive thread convolutions and slidable through said guide, and springs carried by the latter on the outer side and backing the plungers.

11. A ball-feed comprising releasing means for selectively disposing balls into the thread grooves of a rotating screw, said releasing means being operable in timed relation to the speed rotation of the screw, a ball-guidance system having an opening disposed adjacent said screw to permit the balls to be selectively deposited in the threads thereof, and yieldable means disposed adjacent said opening and effective to yieldably oppose any ball tending to be deposited out of a position lagging behind or in advance of said timed relation, said means comprising a ball-guiding groove whose bottom is provided with a spring-tensioned element.

12. A ball-feed comprising releasing means for selectively disposing balls into the thread grooves of a rotating screw, said releasing means being operable in timed relation to the speed rotation of the screw, a ball-guidance system having an opening disposed adjacent said screw to permit the balls to be selectively deposited in the threads thereof, and yieldable means disposed adjacent said opening and effective to yieldably oppose any ball tending to be deposited out of a position lagging behind or in advance of said timed relation, the major thread-diameter of said screw adjacent said opening being sufficiently small to permit balls to jump thereover without jamming the apparatus.

13. A ball-feed comprising releasing means for selectively disposing balls into the thread grooves of a rotating screw, said releasing means being operable in timed relation to the speed rotation of the screw, a ball-guidance system having an opening disposed adjacent said screw to permit the balls to be selectively deposited in the threads thereof, and yieldable means disposed adjacent said opening and effective to yieldably oppose any ball tending to be deposited out of a position lagging behind or in advance of said timed relation, the major thread-diameter of said screw adjacent said opening being sufficiently small to permit balls to jump thereover without jamming the apparatus, and means operative upon said jumping to yieldably oppose said action.

14. A ball-feed comprising means for selectively disposing balls into the thread grooves of a rotating screw, said means being operable in timed relation to the screw rotation, a series of spring-actuated electrical contacts adapted to be opened and closed in relation to the presence of balls in thread grooves, a ball-guidance system having an opening disposed adjacent said screw to permit the balls to be selectively deposited in the threads thereof, additional spring-actuated means disposed adjacent said opening and effective to yieldably oppose any ball tending to be deposited out of said timed relation and said additional spring-actuated means being provided with a pressure in excess of 8 times that exerted by the electrical contact springs.

15. A ball-feed comprising means for selectively disposing balls into the thread grooves of a rotating screw, and being operable in timed relation to the screw rotation, a series of electrical contacts, adapted to be opened and closed in relation to the presence of balls in the thread grooves through the medium of a series of relatively narrow ball-actuated moveable members to actuate said contacts, a ball-guidance system having an opening disposed adjacent said screw to permit the balls to be selectively deposited in the threads thereof, additional relatively wide ball-actuated members disposed adjacent said opening and effective to yieldably oppose balls tending to be deposited out of said timed relation.

16. The structure of claim 15, each of said narrow ball-actuated members being opposed to ball actuation by a spring having a predetermined value while said relatively wide ball-actuated members are opposed to ball actuation by springs having tension in excess of 8 times the above stated predetermined values.

References Cited in the file of this patent

UNITED STATES PATENTS

| 676,044 | Locke | June 11, 1901 |
| 1,346,625 | Woodard | July 13, 1920 |
| 2,734,604 | Soave | Feb. 14, 1956 |
| 2,817,703 | Naxon | Dec. 24, 1957 |
| 2,922,141 | Simmerman et al. | Jan. 19, 1960 |